(12) United States Patent
Dacus

(10) Patent No.: US 8,994,508 B2
(45) Date of Patent: Mar. 31, 2015

(54) INCLUSIVE OR EXCLUSIVE RFID TAG INTERROGATION AND QUERY ROUND

(75) Inventor: Farron Dacus, Dallas, TX (US)

(73) Assignee: Intelleflex Corporation, Santa Clara, CA (US)

( * ) Notice: Subject to any disclaimer, the term of this patent is extended or adjusted under 35 U.S.C. 154(b) by 762 days.

(21) Appl. No.: 12/553,930

(22) Filed: Sep. 3, 2009

(65) Prior Publication Data

US 2010/0148933 A1    Jun. 17, 2010

Related U.S. Application Data

(60) Provisional application No. 61/121,906, filed on Dec. 11, 2008.

(51) Int. Cl.
| | |
|---|---|
| *H04Q 5/22* | (2006.01) |
| *H04Q 9/00* | (2006.01) |
| *G06K 7/00* | (2006.01) |
| *G06K 7/10* | (2006.01) |
| *G06K 19/07* | (2006.01) |

(52) U.S. Cl.
CPC ............. *H04Q 9/00* (2013.01); *G06K 7/0008* (2013.01); *G06K 7/10108* (2013.01); *G06K 19/0716* (2013.01); *G06K 19/0717* (2013.01); *H04Q 2209/47* (2013.01); *H04Q 2209/753* (2013.01); *H04Q 2209/75* (2013.01)
USPC ... 340/10.3; 340/10.2; 340/10.31; 340/10.32; 340/10.4; 340/3.52; 340/7.46; 340/10.1; 235/375; 235/385

(58) Field of Classification Search
CPC ............. G06K 19/07749; G06K 2017/0045; G06K 19/0723; G06K 7/10039; G06K 7/10049; G06K 19/0701; G06K 19/0717; G08B 13/2462; G01S 13/758; H03H 9/6406; G06Q 10/087; G06Q 20/341
USPC ............. 340/10.1–10.4, 7.46, 3.52; 455/41.2; 235/375, 385
See application file for complete search history.

(56) References Cited

U.S. PATENT DOCUMENTS

| | | | | |
|---|---|---|---|---|
| 5,043,718 | A | * | 8/1991 | Shimura ...................... 340/7.46 |
| 5,489,908 | A | * | 2/1996 | Orthmann et al. ......... 340/10.32 |
| 5,673,037 | A | * | 9/1997 | Cesar et al. ................ 340/10.32 |

(Continued)

FOREIGN PATENT DOCUMENTS

| | | |
|---|---|---|
| EP | 1615155 A2 | 1/2006 |
| EP | 1959579 A1 | 8/2008 |

(Continued)

OTHER PUBLICATIONS

International Search Report and Written Opinion from PCT Application No. PCT/US2009/067353 mailed on Feb. 18, 2010.

(Continued)

*Primary Examiner* — Benjamin Lee
*Assistant Examiner* — Quang D Pham
(74) *Attorney, Agent, or Firm* — Zilka-Kotab, PC

(57) ABSTRACT

Embodiments of the present invention allow for dynamic selection and query of different types of RFID tags into a session. Embodiments of the present invention also allow for dynamic activation of different types of RFID tags. In certain embodiments of the invention, an inclusive operation is performed on the RFID tags and in other embodiments an exclusive operation is performed.

30 Claims, 5 Drawing Sheets

(56) References Cited

U.S. PATENT DOCUMENTS

| | | | |
|---|---|---|---|
| 5,856,788 A * | 1/1999 | Walter et al. | 340/10.2 |
| 6,138,001 A * | 10/2000 | Nakamura et al. | 340/7.35 |
| 6,563,417 B1 * | 5/2003 | Shaw | 340/10.1 |
| 7,009,496 B2 * | 3/2006 | Arneson et al. | 340/10.2 |
| 7,158,046 B2 * | 1/2007 | Cesar et al. | 370/313 |
| 7,616,094 B2 * | 11/2009 | Heinrich et al. | 340/10.2 |
| 7,737,822 B2 * | 6/2010 | Amtmann et al. | 340/10.32 |
| 7,769,963 B1 * | 8/2010 | Gravelle et al. | 711/154 |
| 7,893,815 B2 * | 2/2011 | Friedrich | 340/10.2 |
| 8,174,365 B2 * | 5/2012 | Akiyama et al. | 340/10.2 |
| 8,193,910 B2 * | 6/2012 | Murano | 340/10.1 |
| 2002/0008140 A1 | 1/2002 | Reynolds et al. | 235/385 |
| 2002/0119770 A1 | 8/2002 | Twitchell, Jr. | 455/422 |
| 2002/0139860 A1 * | 10/2002 | Ono et al. | 235/487 |
| 2004/0192189 A1 * | 9/2004 | Yuhara et al. | 455/3.02 |
| 2006/0145817 A1 * | 7/2006 | Aikawa et al. | 340/10.3 |
| 2006/0176154 A1 * | 8/2006 | Littlechild et al. | 340/10.5 |
| 2006/0284727 A1 * | 12/2006 | Steinke | 340/10.31 |
| 2007/0069863 A1 * | 3/2007 | Akiyama et al. | 340/10.2 |
| 2007/0126059 A1 * | 6/2007 | Dembo et al. | 257/344 |
| 2007/0159305 A1 | 7/2007 | Cesar et al. | |
| 2007/0200677 A1 * | 8/2007 | Murano | 340/10.31 |
| 2007/0296584 A1 | 12/2007 | Vest et al. | 340/572.1 |
| 2008/0018431 A1 * | 1/2008 | Turner et al. | 340/10.2 |
| 2008/0106382 A1 * | 5/2008 | Choi et al. | 340/10.2 |
| 2008/0122580 A1 * | 5/2008 | Karjoth et al. | 340/10.1 |
| 2008/0129447 A1 * | 6/2008 | Choi et al. | 340/5.61 |
| 2008/0143484 A1 * | 6/2008 | Twitchell | 340/10.1 |
| 2008/0157934 A1 * | 7/2008 | Posamentier | 340/10.42 |
| 2008/0180220 A1 * | 7/2008 | Hollister et al. | 340/10.2 |
| 2008/0280560 A1 * | 11/2008 | Tuttle | 455/41.2 |
| 2009/0303005 A1 * | 12/2009 | Tuttle | 340/10.1 |
| 2010/0066506 A1 * | 3/2010 | Schaefer et al. | 340/10.3 |
| 2010/0127829 A1 * | 5/2010 | Daneshmand et al. | 340/10.1 |
| 2010/0194531 A1 * | 8/2010 | Sato | 340/5.83 |

FOREIGN PATENT DOCUMENTS

| | | |
|---|---|---|
| WO | 2007012065 A2 | 1/2007 |
| WO | WO-2007-122425 * | 11/2007 |

OTHER PUBLICATIONS

Extended European Search Report from European Application No. 09832478.3 dated May 12, 2012.

Intent to Grant from European Application No. 09832478.3 dated Oct. 2, 2013.

European Office Communication from European Application No. 09832478.3 dated Mar. 5, 2013.

* cited by examiner

Flex_Query Command

| | Command | Tag Type Select | SS Response | DR | M | TRext | Sel | Session | Target | Q | CRC-5 |
|---|---|---|---|---|---|---|---|---|---|---|---|
| # of bits | 8 | 12 | 1 | 1 | 2 | 1 | 2 | 2 | 1 | 4 | 5 |
| Description | 11001111 | | 0: Disable<br><br>1: Enable | 0: DR=8<br><br>1: DR=64/3 | 00: M=1<br>01: M=2<br>10: M=3<br>11: M=4 | 0: No pilot tone<br>1: Use pilot tone | 00: All<br>01: All<br>10: ~SL<br>11: SL | 00: S0<br>01: S1<br>10: S2<br>11: S3 | 0: A<br>1: B | 0-15 | |

FIG. 3

Flex_Query Command Tag Type Select Field

| Interpre-tation | RFU | RFU | Sensor Alarm | Full Function Sensor | Simple Sensor | Active Class 4 Type 2 | Active Class 4 Type 1 | Semi-Active Class 3+ | Semi-Passive Class 3 | Semi-Passive Class 3 | Passive Class 2 | Passive Class 1 |
|---|---|---|---|---|---|---|---|---|---|---|---|---|
| 1 | 1 | 1 | 1 | 1 | 1 | 1 RFU | 1 RFU | 1 RFU | 1 | 1 | 1 RFU | 1 |
| 0: Inclusive<br><br>1: Exclusive | | | 0: Disable<br><br>1: Enable | 0: Disable<br><br>1: Enable | 0: Disable<br><br>1: Enable | 0: Disable<br><br>1: Enable | 0: Disable<br><br>1: Enable | 0: Disable<br><br>1: Enable | 0: Disable<br><br>1: Enable | 0: Disable<br><br>1: Enable | 0: Disable<br><br>1: Enable | 0: Disable<br><br>1: Enable |

FIG. 4

INCLUSIVE OR EXCLUSIVE RFID TAG INTERROGATION AND QUERY ROUND

CROSS REFERENCE TO RELATED PATENT APPLICATIONS

This application claim priority to U.S. Provisional Application Ser. No. 61/121,906, entitled "Inclusive or Exclusive RFID Tag Interrogation and Query Round," filed Dec. 11, 2008, which application is incorporated herein by reference in its entirety.

BACKGROUND

A. Field of the Invention

The present invention relates generally to the field of Radio Frequency Identification (hereinafter, "RFID") systems, and more particularly to advanced RFID systems which employ diverse RFID tags, such that a certain subset of tags may be queried into a round based on a particular tag type(s) or characteristic(s).

B. Background of the Invention

The applications and importance of RFID technology has significantly grown in recent years due to a number of reasons including improvements in IC processes, RFID standards development, government allocation of increased spectrum for RFID, and growing awareness of the value of automated tracking of assets. During this growth, RFID systems have progressed from relatively simple, lower-frequency systems to include more complex systems that operate in the longer-range Ultra-High Frequency spectrum. The lower-frequency, generally inductively-coupled systems are usually referred to as Low Frequency (hereinafter "LF", approximately 100-150 KHz) and High Frequency (hereinafter "HF", typically 13.56 MHz) systems. These system generally operate from ranges of a few centimeters to approximately 1 meter, and are limited in range due to the physics of "near field" communications that do not rely on a propagating electromagnetic wave. The systems operating in the Ultra-High Frequency (hereinafter "UHF", typically 800 to 1000 MHz) range can have longer ranges due to more favorable physical propagation.

Passive LF, HF, and UHF RFID systems comprise tags that operate without batteries and effectively leverage power that is wirelessly received from an RFID reader to communicate information back to the reader. In the UHF case, this process is typically called "backscatter" and allows a passive tag to communicate with an RFID reader over limited distances. Because these tags are effectively powered by the field of an RFID reader, the distance the tag can communicate is limited by its own power consumption. As a result, passive UHF systems generally operate with practical ranges of several meters.

Despite UHF RFID systems having extended range as compared to LF and HF, there are many applications needing a still longer operating range while also maintaining high reliability. Active RFID systems extend range by providing a power source and full featured radio on the tag. "Full featured" is intended to mean a highly sensitive and selective (interference rejecting) receiver and active transmitter whereby the tag creates its own transmit signal. These active systems can achieve ranges of hundreds of meters, but cost significantly more than passive systems. Additionally, the operational life of the active systems is limited by the batteries deployed within the tags and the ability to replace these batteries over the life of the system. Some applications, such as tracking of military supplies, can absorb the relatively higher cost of these active systems, but many others cannot.

To provide an intermediate level of performance between fully passive and fully active RFID systems, there has been over the last few years a movement to introduce "battery-assisted" or "semi-passive" RFID systems. These systems utilize the UHF band and extend upon passive tags by providing tag operating power from a compact battery such as a coin cell, thus enhancing range by eliminating the requirement for the tag to receive sufficient RF signal power to actually power itself from the signal. The tag may also utilize baseband signal gain to further enhance sensitivity. The tag maintains the use of a simple and low power "backscatter" transmitter that operates by modulating a reflection of a reader provided RF signal back to the reader. Standardization efforts have been underway within the International Standards Organization (ISO) to add semi-passive RFID technology to its UHF RFID standard, referred to as ISO/IEC 18000-6. The applicant is an active member of this organization and has contributed significantly to this particular effort.

1. Definitions

For the purposes of this invention, the following RFID tag types are defined by class. The RFID tag descriptions refer to UHF RFID tags generally operating in industrial, scientific, and medical bands with other short range radio applications, or in specialized RFID bands from 400 to 1000 MHz (most commonly 800 to 1000 MHz).

1. Passive or Class 1. In these systems, tags operate without a battery and are powered by an incoming reader field of a reader. A tag has a detector which converts RF energy into DC energy to power associated integrated circuitry within the tag. Tag sensitivity is generally on the order of about −5 dBm to −20 dBm, and reader sensitivity is on the order of about −60 to −80 dBm. Practical ranges are generally 1 to 5 meters. The system is generally "forward-link limited" due to the modest sensitivity of the tag.

2. Passive plus security or Class 2. These systems feature the same radio link technology as Class 1, but with added memory and security, and sometimes other features such as sensors.

3. Semi-Passive or Class 3. These systems feature a small battery (e.g., lithium manganese dioxide coin cell), for providing power to the tag, thus relieving the tag of very close proximity requirements to the reader. The tag receiver will generally still be wide-band detector based, though optionally improved by the use of active gain, and the tag transmitter will still use backscatter modulation. A well designed Semi-Passive tag may have tag sensitivity of up to approximately −60 dBm without an RF amplifier. A well engineered Semi-Passive system can have free space range of several hundred meters and practical ranges of several tens of meters. However, due to asymmetric backscatter link physics that favors the forward-link from reader to tag, these systems will typically be "reverse-link" limited by the sensitivity of the reader receiver. The system may also be limited by interference seen at either the tag or the reader.

4. Semi-Active or Class 3 Plus. These systems supply an optional active transmitter in the tag to substitute for backscatter transmission. This relieves the reverse-link limit of the Class 3 link, and with the addition of an RF amplifier in the tag creating tag sensitivity in the range of −70 to −80 dBm (U.S. bandwidth) generally results in an approximately "balanced link" where approximately the same link loss is allowed in both directions. For example, a link employing a reader transmitting a maximum effective radiated power of +36 dBm (the current limit for U.S. operation) and a tag sensitivity of −75 dBm can allow up to 111 dB of total link loss in the forward link. If the reader sensitivity is −110 dBm (achievable when the carrier does not have to maintain a carrier due to the transmitter providing its own transmitter), and the tag transmits 0 dBm, then the reverse link loss can be up to −110 dB. Class 3 Plus systems are not currently fielded, but they are the only class that has almost near perfect matching between forward and reverse link performances, and there are compelling technical and economic reasons to develop them.

5. Fully-Active, Active, or Class 4. These systems use fully functioning radios at the tag with receiver bandwidths similar to spectral occupancies of reader transmit signals, thereby allowing higher sensitivity and interference rejection at the tag. They also use tag transmit carriers generated on the tag that do not have to decline in transmit power as range increases, which is an inherent weakness of backscatter systems. These systems currently exist and function well, although the tags are approximately an order of magnitude higher in cost than semi-passive systems, and about two orders of magnitude higher in costs than passive systems. An enhancement to the state of the art presented in this disclosure is the part time use of Fully-Active radio circuitry in the tag in combination with high performance Semi-Passive circuitry that is used under most operating conditions, thus maximizing battery life while providing additional performance when needed.

6. Battery Assisted Passive tag, or BAP tag. This term specifically means a battery assisted tag that maintains a backscatter transmitter, or a Class 3 tag.

7. Battery Assisted Tag, or BAT. This term also commonly refers to a tag with battery assisted tag receiver enhancement, while still maintaining a backscatter based tag transmitter. The term was originally coined to specifically refer to Class 3 operation and to distinctly mean not having active radio features on the tag. However, it is envisioned here that Class 3 will become a battery saving "base mode" for Class 3 Plus and Class 4 tags that use Class 3 when the link is sufficient, and progress to the active modes as needed. Thus, the use of the term "BAT" may in the future come to refer to any tag with battery assisted tag receiver enhancement. In this disclosure a BAT may thus refer to a Class 3 Plus or Class 4 tag that supports Class 3 operation, with the option of using the more advanced Class 3 Plus or Class 4 modes when link conditions require that higher performance.

8. Hibernation. A state of low power consumption (sleep) in which a tag can listen for an "activation" command to awaken it to "normal" mode for full communication and operation. Class 3, 3 Plus, 4 and other tags may optionally implement a hibernate mode.

9. Power Leveling. A wireless industry term applied to general intelligent control of transmitter RF power levels. Transmit power control is a commonly used means of controlling interference in dense wireless system such as cellular telephony.

As RFID system become more commonly integrated within storage and transportation environments, an increasingly diverse set of RFID tags will likely be employed, with a wider variety of features. It will thus become more important that a user be able to select and query a certain group of RFID tags that meet particular selection criteria. For example, a user may want to query RFID tags having sensor capabilities and/or a particular air interface capability. One skilled in the art will recognize that many other tag types and/or characteristics than this example may exist. This diversity across RFID tag functionality allows for certain tags to more efficiently operate in particular environments as well as for certain tags to provide specific information.

SUMMARY OF THE INVENTION

Embodiments of the present invention allow for a dynamic selection and query of different types of RFID tags into a session. Embodiments of the present invention also allow for dynamic activation of different types of RFID tags. Embodiments of the present invention also allow for a dynamic selection and query of RFID tags having one or more common characteristics into a session or round. In certain embodiments, a plurality of RFID tags are activated relative to a set of tag characteristics and subsets of those RFID tags are selected to be brought into a subsequent query rounds. In certain instances, each of these tags within the subset has all of the tag characteristics within the set of criteria used to interrogate the tags (i.e., an exclusive query) in order for the tag to be selected for the operation. In certain other embodiments, the subset of RFID tags that are queried are relaxed to only require having at least one of the characteristics within the set of desired criteria (i.e., an inclusive query).

This interrogation, selection and query of the desired tag subset allows a reader to more reliably inventory important tag populations by avoiding time wasted on undesired tags. It also reduces the amount of interference caused by irrelevant RFID tags that are unnecessarily inventoried during the round. Furthermore, in the case of very large RFID systems, the ability to interrogate and accurately query a relevant subset of tags potentially reduces processing demands of readers and backend computing devices that must otherwise process information received from irrelevant tags during the round.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 3 shows an exemplary Flex_Query command that allows faster access while still maintaining the ability to selectively bring tags into Query rounds based on their basic types and attributes according to various embodiments of the invention. The types are selected in the Tag Type Select field.

FIG. 4 is an exemplary Flex_Query command Tag Type Select field according to various embodiments of the invention.

DETAILED DESCRIPTION OF THE INVENTION

Figure 1:
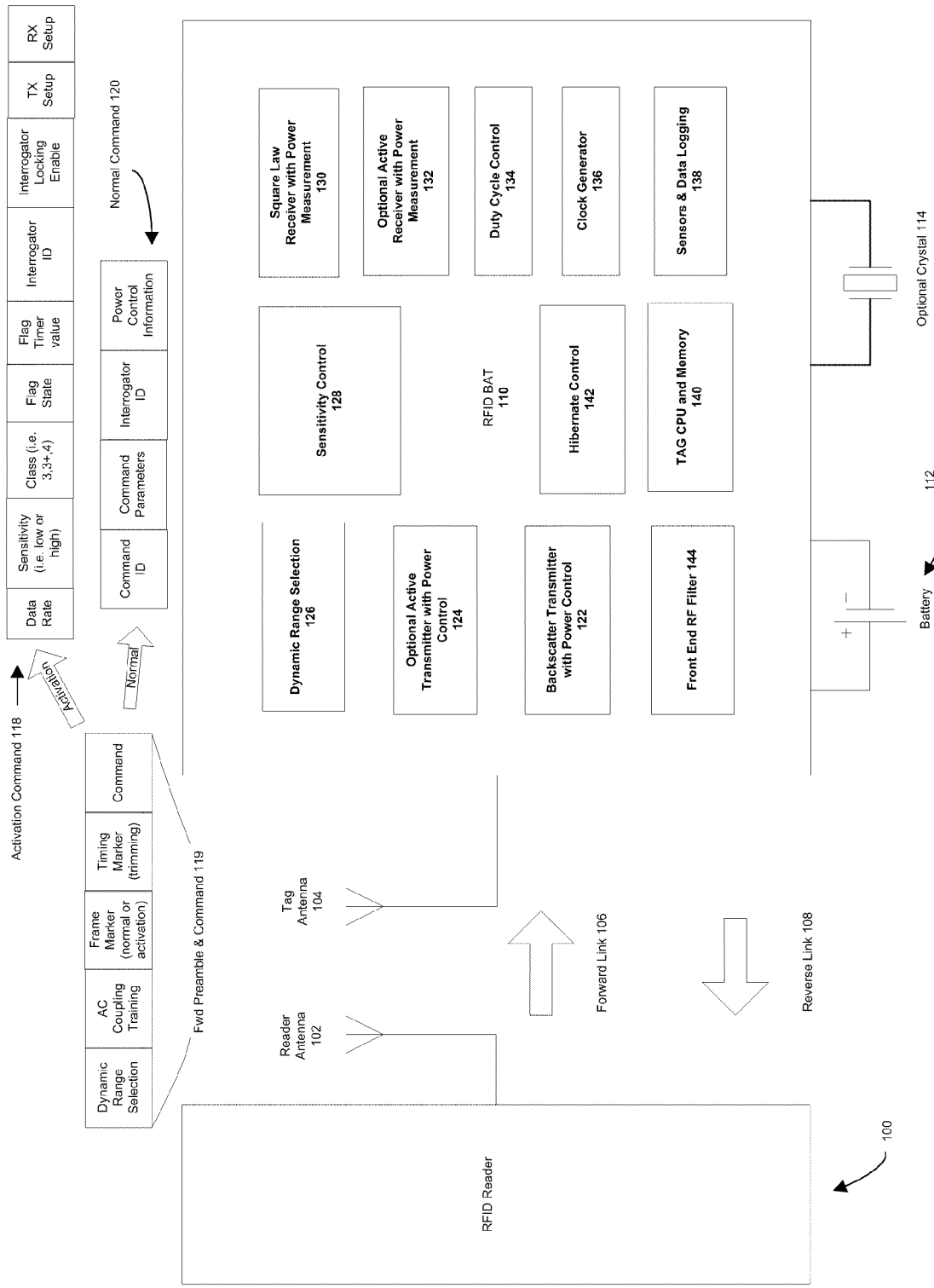
FIG. 1 generally illustrates communication between an RFID reader and a battery assisted RFID tag according to various embodiments of the invention.

In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Embodiments of the present invention allow for a dynamic selection and query of different types of RFID tags into a session. The term "query" is defined to mean using a command, (e.g., "Query command") to cause a set of tags to enter a round (e.g., "query round") where they are responsive to additional interrogator commands that isolate (or "singulate") each tag one by one for further access. For example, in the ISO 18000-6C standard these additional commands are primarily to count down a random number selected by the tag upon receipt of the Query command, whereby the tag responds when the tag reaches zero. This separates tag responses in time. These isolated responses usually contain an identifying number, and if desired the interrogator may proceed with memory or sensor accesses. Tags that happen to choose the same random number and interfere with each other on their replies are usually addressed in a subsequent query round. Embodiments of the present invention also allow for a dynamic selection and query of RFID tags having one or more common characteristics into a session or round. In certain instances, each of these tags within the subset must possess all of the tag characteristics within the set of desired criteria desired to select the tags (i.e., an exclusive query). In certain other embodiments, the subset of RFID tags that are queried is more relaxed and must only have at least one of the desired characteristics (i.e., an inclusive query) to enter the subsequent query round.

For example, consider a user desiring to select certain tags having sensor capabilities and/or a particular air interface capability within a larger population of tags. The selection of all tags having sensor capabilities may be taken by selecting those criteria in inclusive form. A user may want to query RFID tags having a particular battery supported air interface, which may be accomplished inclusively by selecting that criteria. But, if a user wishes to inventory only tags have a particular sensor capability and a particular air interface capability, this cannot be accomplished by inclusive selection. The selection of both types inclusively would include all tags that meet either type. But, the desired goal of selecting only tags that possess both features can be attained if the functionality of the selection function is dynamically switched from inclusive to exclusive. This switch may be applied at the activation process, so that the exactly desired tags are awoken from hibernation, and also at the interrogation process, so that the exactly desired tags are taken into an interrogation round. The term "interrogate" is here defined as that process within the query round of singulating each tag for individual access.

For purposes of illustration, an exemplary RFID system using at least some battery assisted RFID tags is described. However, one skilled in the art will recognize that various different types of RFID tags, having a diversity of characteristics, may be queried using embodiments of the invention including both passive, semi-active and active tags as well as a diverse set of features across each of the tag types.

A. Battery Assisted RFID System and Tag

Class 1 passive systems are typically of only modest tag sensitivity and are typically "forward link limited," meaning the reader-to-tag link fails at a shorter range than the tag-to-reader link. Using a battery in the tag improves tag sensitivity; however, due to the characteristics of the tag square law receiver, AC coupling and the implementation of multiple dynamic range states may be required, which may be accounted for in a protocol according to various embodiments of the invention. In many instances, it is difficult for the weak reverse link to keep up with the now much more capable forward link. However, the reverse link may be strengthened by advanced reader designs, such as those using ultra-low phase noise local oscillators and maximum transmit carrier to reader receiver isolation to enhance their sensitivity. Even so, with tag sidebands close to the carrier frequency, the reader will usually be phase noise limited as to sensitivity. This is improved by the use of tag backscatter "subcarriers," such as the Miller modulation mode of ISO/IEC 18000-6C, in which higher frequency subcarriers move tag backscatter sidebands "down the phase noise curve" and thus improve reader sensitivity.

Making intelligent use of this improved sensitivity at both ends of the link may require reducing reader-on-reader and reader-on-tag interference with lower forward modulated power than the pure carrier used to support backscatter. Other interference control measures, such as optional split bandplans, time coordination, and use of higher backscatter supporting carrier power than used in forward link communications, may also be used. Additionally it may be advantageous to use optional or full time active transmission from the tag for links or applications needing a better link than is possible with a backscatter tag transmitter.

FIG. 1 illustrates the system operation of a battery supported RFID tag. A tag 110 wirelessly receives a forward link signal 106 from an RFID reader 100. The forward link signal is modulated by the reader 100 and demodulated by the tag 110. Tag front end RF filter 144 may sometimes provide wide RF band but not narrow RF channel selectivity in the tag's low power RFID receiver, which is a limitation on RFID system performance since the tag is subjected to interference from all transmitters above its sensitivity level in the RF band. In such certain embodiments of the invention, high sensitivity RF tags employing wide band filters that are subject to interference and RFID interference control measures are described to cope with such interference. In other embodiments the front end filter 144 is narrower and its frequency is adjusted in accordance with the regulatory region of operation or the presence of interference. For example, the reader may sense the presence of interference due to cellular transmissions near the frequency of RFID operation, and command the tag to alter its front end filter frequency range. Such settings may be conveniently commanded through memory writes by the reader to the Settings File disclosed herein. If the tag 110 includes optional Active Receiver 132, then tag 110 has access to a narrow-band interference rejecting receiver.

When it is the tag's turn to transmit, and the tag is going to use Class 3 mode, the reader provides a pure carrier that the tag can reflectively backscatter as reverse link signal 108 having an associated power level and containing information to be received by the RFID reader 100. The use of the backscatter transmitter saves the cost and power consumption of having an active transmitter on the tag, or utilizing an optional active transmitter on the tag in circumstances where a backscatter transmitter is adequate.

Various embodiments of the invention include devices and methods that enable improved reception of received signal at the tag, provide for preferred modal operation (e.g., active or square law mode) of the tag, and provide for interference control within the total RFID system. Square law tag receiver 130 provides a certain level of sensitivity in the tag. If this sensitivity is too much for the interference environment, then sensitivity control 128 controlled by activation command 118 is used to limit sensitivity. When better sensitivity or interference rejection is needed, then the tag may be commanded to switch to optional active receiver 132, which is supported by battery 112.

Power measurement capability in both square law receiver 130 and active receiver 132 allows the tag to be aware of receive signal power, and combined with power control information in normal command 120 allows control of the power output of both backscatter transmitter 122 and optional part time active transmitter 124. To improve battery life, duty cycle control 134 may be applied to place the receiver into power saving part time operation in either or both of hibernation or normal mode.

Clock generator 136 may be used in conjunction with single crystal 114 to generate return data rate clock, return subcarriers, controller clock, data logger clock, and input reference frequency for the frequency synthesizer of active transmitter 124 and active receiver 132. In certain embodiments, crystal 114 is a low cost and low power tuning fork type from approximately 20 kHz to 100 kHz, such as the common 32.768 kHz "watch crystal." Sensor and data logger 138 expands the normal identification function of RFID to allow for market desired sensor operations such as temperature logging of goods in the cold chain, and is improved via the timing precision of crystal 114.

Tag controller 140 may be of digital state machine or firmware programmed microcontroller form, or a combination of microcontroller plus hardware support such as subcarrier generation and receive symbol synchronization. Hibernate control 142 may be a low power microcontroller or a dedicated state machine. Hibernate controller 142 may include pseudo-random "PN" sequence flag correlator and bit destuffer as later described.

PN flag usage will be fully described later and is a method that allows a standard {0, 1} symbol set to serve as activation validity signaling and frame synchronization. Use of only the {0, 1} symbol set is preferred over prior art methods of special longer symbols because it allows a reduced channel bandwidth, a reduced coupling capacitor size and die area, and a reduction of on-die flicker noise that limits tag sensitivity. Flicker noise is a particular problem in the case of CMOS integrated circuit implementation.

B. RFID Tag Interrogation and Query

Figure 2A:
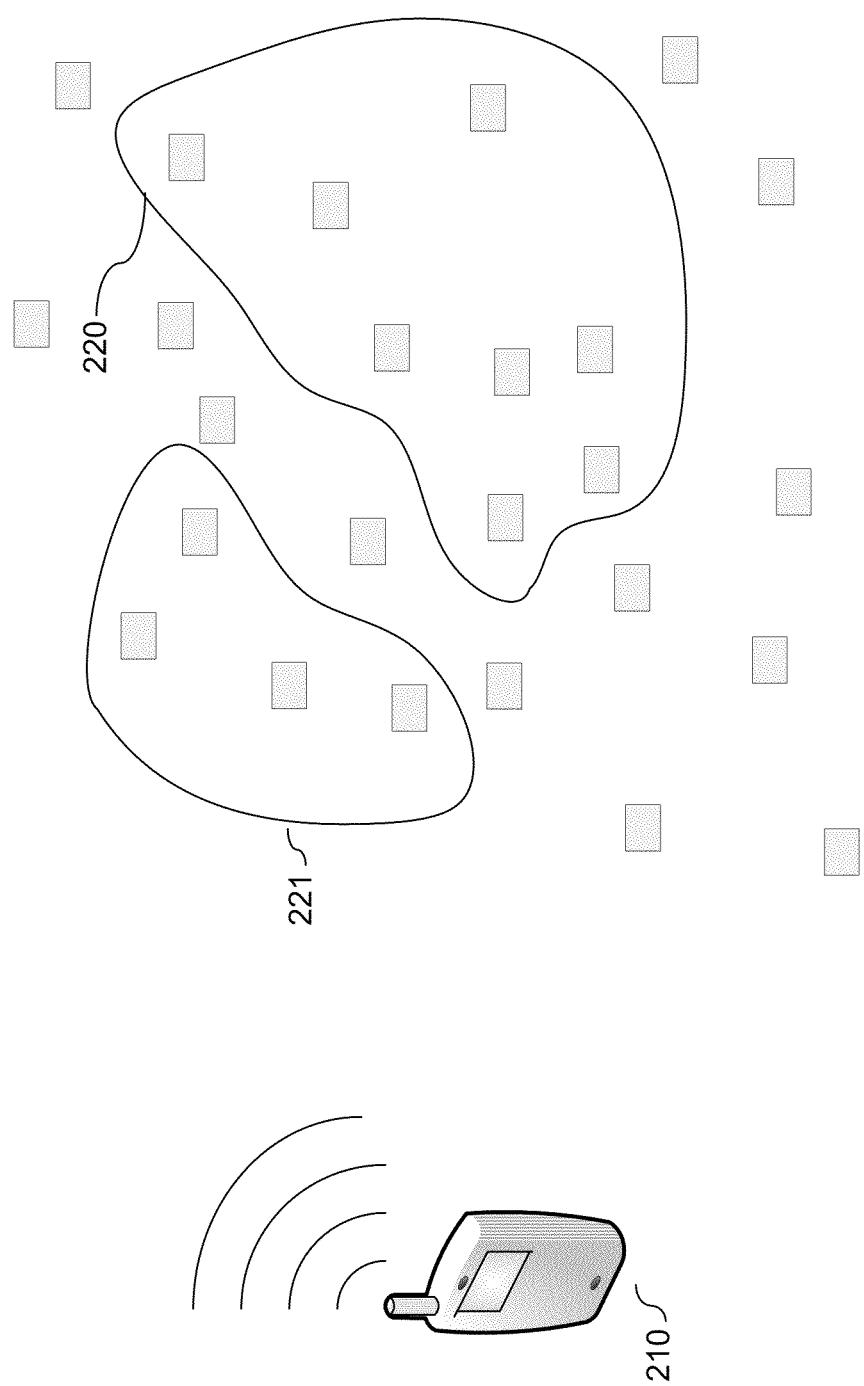
FIGS. 2A and 2B are exemplary RFID systems in which a plurality of RFID tags are interrogated and a subset selected and queried into a round relative to certain tag types and/or characteristics according to various embodiments of the invention.
Figure 2B:
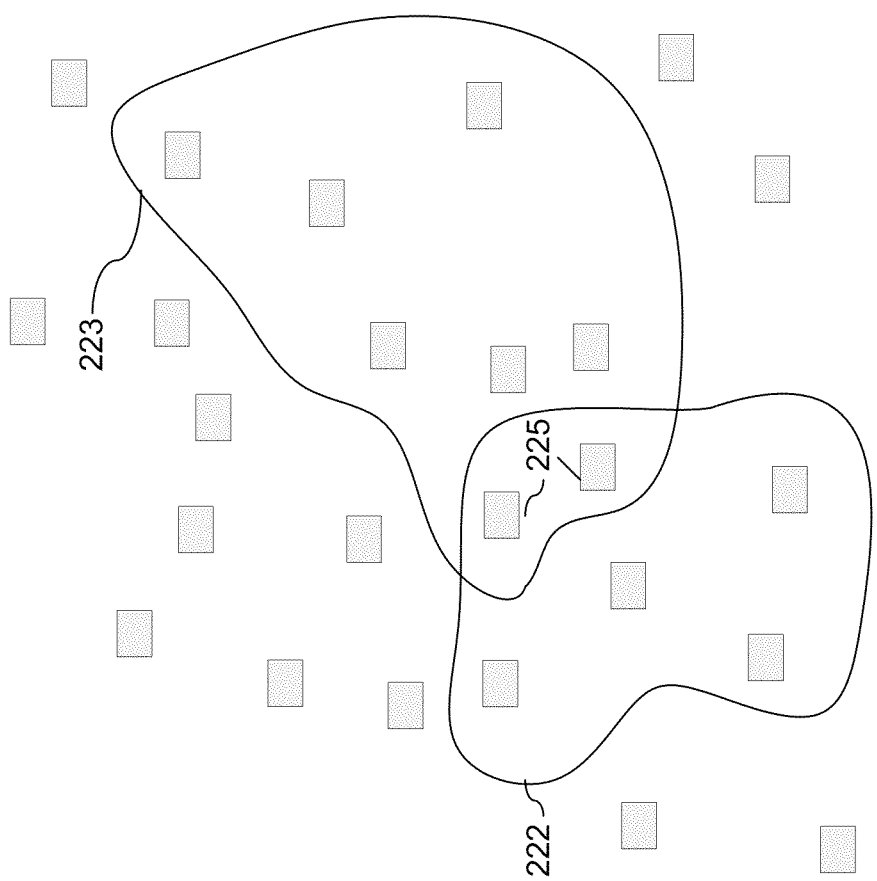
Figure 2B:
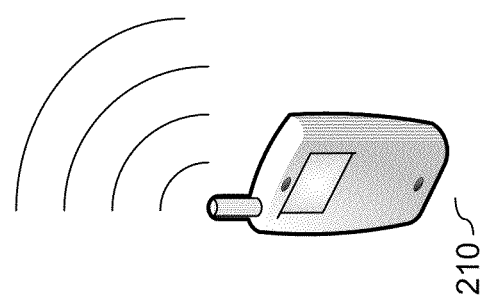

FIGS. 2A and 2B illustrate an exemplary RFID system in which a reader is able to interrogate, select and query a subset of tags within the system relative to one or more criteria. The reader 210 interrogates the RFID tags and selects certain tags that meet a selection criteria threshold that may include RFID tag types and/or tag characteristics. This process may include an activation command that provides each of the tags a request to activate if the tag is able to meet the selection criteria. Similarly, if activation is not applicable or after being awakened from hibernation, such selection may be applied to the process of taking tags into an interrogation round by a query command. If the selection criteria (including necessary inclusive or exclusive criteria) are met, then the particular tag(s) are included within a round.

According to FIG. 2A, a situation is shown in which there is no intersection between a first subset of tags 220 identified selected relative to a first characteristic and a second subset of tags 221 selected relative to a second characteristic. Accordingly, an inclusive selection is suitable to select either of these subsets or the union of both subsets. FIG. 2B shows a situation in which there are two subsets of tags 222 and 223. It is desired to select the tags that share both characteristics, which is the intersection of these two subsets. This selection cannot be made with an inclusive (OR) selection. However, by switching the functionality of the selection process from inclusive to exclusive, the desired intersection may be selected by indicating via selection 222 AND 223=225. This results in the two tags 225 as identified by a union based on sharing both the first and second characteristic. By having both inclusive and exclusive processes dynamically available, the same selection field can be interpreted these two fundamentally different ways in order to allow this improved control.

This activation, selection/query, and interrogation of the desired tag subset allows a reader to more reliably inventory important tag populations by avoiding time wasted on undesired tags. It also reduces the amount of interference caused by irrelevant RFID tags that could be unnecessarily inventoried during the round. Furthermore, in the case of very large RFID systems, the ability to activate (as applicable), query, and accurately interrogate a relevant subset of tags potentially reduces processing demands of readers and backend computing devices that must otherwise process information received from irrelevant tags during the round.

In certain embodiments of the invention, the activation (if applicable) and the query are considered inclusive such that an activated RFID tag must meet only one of the characteristics within the selection criteria. In other embodiments of the invention, the activation and/or query are considered exclusive such that the RFID tag must meet all of the indicated characteristics within the selection criteria.

The RFID system may switch between an inclusive or exclusive activation and/or query mode using various methods known to one of skill in the art. For example, a bit or bits within the activation or query command may identify to the tag whether the activation and/or query is an inclusive or exclusive action. This selection bit(s) may be completely distinct within the field (e.g., such as a mode switching field) or integrated within another field of the command frame (e.g., such as a tag type select field). One instance of this mode selection would be to include a single bit within a "Tag Type Select Field" in a Flex_Query command described in more detail below.

One skilled in the art will recognize that the selection criteria may include numerous different types of RFID tags as well as different characteristics thereof. An exemplary list is provided below:

1. Passive tags: These tags include pure passive tags as well as battery tags with dead batteries that support "dead battery response." In some instances, a passive tag may not support a Flex_Query.
2. Battery Assisted Passive (BAP): This term refers to battery assisted tags of both PIE and Manchester form. Under the ISO 18000-6 draft in effect as of the time of this filing, only BAP PIE tags need a special query command (the Flex_Query) to implement inclusive and exclusive selection switching. The Manchester Query command, having been designed specifically for BAP tags, contains this switching functionality.
3. Class 3 Plus: These tags are envisioned to contain a part time active transmitter that may be used when link conditions are too hostile for reliable backscatter operation.
4. Class 4: These tags are envisioned to contain a part time active transmitter and part time active receiver that may be used when link conditions are too hostile for reliable backscatter operation and/or square law receiver operation.
5. Class 4 Plus: These tags may provide more advanced active functionality such as tag to tag networking.
6. Security Characteristics: Certain tags may provide security features such as encryption or tamper detection.

7. Sensor Characteristics: Certain tags may provide sensor features that allow a tag to track and transmit information about an item. These sensors may include, but are not limited to, temperature, humidity, pressure, location, chemical density, etc.
8. Memory Characteristics: Certain tags may provide large amounts of memory that function as portable floating databases.
9. Alarm Characteristics: Certain tags may provide alarm functionality that generates and stores alarm information relative to an event occurring.

FIG. 3 shows an exemplary Flex_Query command according to various embodiments of the invention. This particular command corrects a situation which previously required separate Select and Query commands are required in order to selectively bring different categories of tags (such as ID only tags and sensor enabled tags) into interrogation/query rounds. In passive systems in particular this is problematic, as the low sensitivity of passive tags lead to tags in motion only having brief windows of time in which they can be accessed. This new command allows faster access while still maintaining the ability to selectively bring tags into query rounds based on their basic types and characteristics. In certain embodiments, this is referred to herein as a "mini-select" function, as compared to a full featured separate "Select."

The types and characteristics of tags are selected in the Tag Type Select field, which is detailed in FIG. 4 according to various embodiments of the invention. The 12 bits of this field allow selection of any combination of tag types and/or characteristics such as those described above. In certain embodiments, the Tag Type Select field allows for several types of sensors including Simple and Full Function sensors, and tags with sensors that have experienced an alarm condition (such as temperature out of range). Exemplary tag air interface types in the Tag Type Select field include Passive Class 1 and 2, and Semi-Passive Class 3. Reserved for Future Use (RFU) fields may in future standard versions allow for Semi-Active Class 3 Plus, and several variation of Class 4 (such as simpler Class 4 that do not feature tag-to-tag networking, and more advanced Class 4 that may feature tag-to-tag networking).

Certain embodiments of the invention provide the Flex_Query an ability to control Simple Sensor entry into interrogation/query rounds and also control of Simple Sensor response. "Simple Sensors" are defined as sensors with a set of preprogrammed behaviors that generate a small amount of sensor data (for example, a notification that a temperature sensing tag has been exposed to temperature limit outside its preprogrammed range) and that were originally intended to automatically transmit that data in addition to their identifying data when the tag was properly singulated. Simple Sensors automatic response allows their data to be read by the reader without taking the time to choose Simple Sensor tags via the "Select" command for inclusion in a query round. Taking such time, particularly in the case of tags with less than excellent sensitivity, leads to a statistical increase in the tag read failure rate. But, having Simple Sensors always transmitting their data, in case of many Simple Sensor tags mixed with a population of tags without Simple Sensors, would noticeably slow the singulation process, also statistically leading to an increase in the number of missed tags that were not properly singulated and read.

Embodiments of the invention build the "mini-select" functionality described above into a specialized query command that could then choose whether or not Simple Sensor commands would enter the query round, and also whether their automatic response function would be in effect for the particular query round.

While the invention is susceptible to various modifications and alternative forms, specific examples thereof has been shown in the drawings and is herein described in detail. It should be understood, however, that the invention is not to be limited to the particular form disclosed, but to the contrary, the invention is to cover all modifications, equivalents, and alternatives.

What is claimed is:

1. A method for interrogating a plurality of RFID tags having a diverse set of RFID tag characteristics, the method comprising:
    creating a command that identifies a first set of RFID tag characteristics corresponding to a first set of RFID tags to be selected within the diverse set of RFID tag characteristics corresponding to the plurality of RFID tags, wherein the first set of RFID tag characteristics includes more than one RFID tag characteristics;
    inserting bits within the command; the bits comprising
        at least one bit for identifying a type of tag interrogation to be performed and identifying a type of tag activation to be performed, wherein identifying said type specifies between an inclusive and an exclusive type, and
        two or more additional bits, each identifying an individual characteristic of said first set of RFID tag characteristics,
    wherein identification of said inclusive type and said exclusive type is used to specify a corresponding inclusive and exclusive operation to be performed in the plurality of RFID tags on the first set of RFID tag characteristics of the command with corresponding tag characteristics of said plurality of RFID tags to identify said first set of RFID tags to be selected;
    transmitting the command to the plurality of RFID tags;
    selecting said first set of RFID tags based at least in part on the first set of RFID tag characteristics and the at least one of the type of tag interrogation and the type of tag activation and a corresponding inclusive or exclusive operation being performed; and
    interrogating the first set of RFID tags.

2. The method of claim 1 wherein the type of tag interrogation is the exclusive interrogation where the RFID tags within the first set of RFID tags must have all the RFID tag characteristics in the first set of RFID tag characteristics to be selected.

3. The method of claim 1 wherein the type of tag interrogation is the inclusive interrogation where the RFID tags within the first set of RFID tags must have at least one of the RFID tag characteristics in the first set of RFID tag characteristics to be selected.

4. The method of claim 1 further comprising activating the plurality of RFID tags prior to transmitting the command, wherein the first set of RFID tags includes less tags than the plurality of RFID tags that are activated.

5. The method of claim 1 wherein the first set of RFID tag characteristics identified in the command includes a bit for identifying a tag class identifier.

6. The method of claim 5 wherein the diverse set of RFID tag characteristics comprises a bit for identifying a security characteristic, and at least one characteristic related to at least one of a tag alarm status, a tag class, a sensor type, and a tag memory.

7. The method of claim 1 wherein the diverse set of RFID tag characteristics includes a security characteristic.

8. The method of claim 1 wherein the diverse set of RFID tag characteristics includes a sensor characteristic.

9. The method of claim 1 further comprising, prior to transmitting the command,
creating an activation command that identifies a second set of RFID tag characteristics within the diverse set of RFID tag characteristics, the second set of RFID tag characteristics includes more than one RFID tag characteristics;
inserting a bit or bits within the activation command that identifies a type of tag activation to be performed based on the first and second RFID tag characteristics being the inclusive or exclusive type;
transmitting the activation command to the plurality of RFID tags; and
activating a second set of RFID tags based at least in part on the second set of RFID tag characteristics and the bit or bits in the activation command defining the inclusive or exclusive type,
wherein the first set of RFID tags are selected from the activated second set of RFID tags.

10. The method of claim 1 wherein the diverse set of RFID tag characteristics includes at least one of an alarm characteristic, a memory characteristic, and a characteristic related to passive tags.

11. An RFID system comprising:
a plurality of RFID tags that have a diverse set of RFID tag characteristics; and
a reader configured to create a command that identifies a first set of RFID tag characteristics corresponding to a first set of RFID tags to be selected within the diverse set of RFID tag characteristics corresponding to the plurality of RFID tags; wherein the command is used to query the plurality of RFID tags and to take the first set of RFID tags, within the plurality of RFID tags, into a query round, wherein the first set of RFID tag characteristics includes more than one RFID tag characteristics;
wherein the reader is configured to transmit the command to the plurality of RFID tags; the command comprising:
a flag for identifying a type of tag interrogation to be performed, wherein identifying said type specifies between an inclusive and an exclusive type; and
a plurality of bits, each identifying an individual characteristic of said first set of RFID tag characteristics,
wherein identification of said inclusive type and said exclusive type is used to specify a corresponding inclusive and exclusive operation to be performed in the plurality of RFID tags on the first set of RFID tag characteristics of the command with corresponding tag characteristics of said plurality of RFID tags to identify said first set of RFID tags to be selected;
wherein the command is configured to activate RFID tags that meet only one of the RFID tag characteristics within the first set of RFID tag characteristics when the flag defines as said inclusive type, and
wherein the command is configured to activate RFID tags that meet all of the indicated RFID tag characteristics within the first set of RFID tag characteristics when the flag defines as said exclusive type.

12. The RFID system of claim 11 wherein the flag is a single bit, and wherein the command is configured to activate the RFID tags without the reader transmitting any additional command.

13. The RFID system of claim 11 wherein the first set of RFID tag characteristics identified in the command includes a tag class identifier, wherein the diverse set of RFID tag characteristics comprises a security characteristic, and at least one RFID tag characteristics related to at least one of a tag alarm status, a tag class, a sensor type, and a tag memory.

14. The RFD system of claim 11 wherein the first set of REID tag characteristics includes at least three RFID tag characteristics.

15. The RFID system of claim 11 wherein the reader is configured to activate the plurality of RFID tags prior to transmitting the command, wherein the first set of RFID tags includes less tags than the plurality of RFID tags that are activated.

16. The RFID system of claim 11 wherein the first set of RFID tag characteristics comprises at least one characteristic related to at least one of a tag alarm status, a tag class, a sensor type, a tag memory, and a tag security.

17. An RFID tag comprising:
an antenna coupled to receive an interrogation command from an RFID reader; and
a processor, coupled to receive the interrogation command, the processor being configured to process a first set of RFID tag characteristics of the RFID tag against an interrogation set of RFID tag characteristics selected from a diverse set of RFID tag characteristics corresponding to a plurality of RFID tags by the RFID reader, the interrogation set of RFID tag characteristics being embedded within the interrogation command transmitted by the RFID reader that interrogates the plurality of RFID tags and takes the RFID tag into an interrogation round based at least in part on the first set of RFID tag characteristics having a predetermined relationship with the interrogation command; and
wherein the processor is configured to process bits in the interrogation command that define the relationship of the first set of RFID tag characteristics as being inclusive or exclusive with respect of the first set of RFID tag characteristics included in the interrogation command, and determine whether a response is to be transmitted to the RFID reader based on at least one of a type of tag interrogation and a type of tag activation indicated in the interrogation command and whether the RFID tag has the interrogation set of RFID tag characteristics indicated in the interrogation command; the bits within the interrogation command comprising:
at least one bit for identifying the type of tag interrogation to be performed and identifying the type of tag activation to be performed, wherein identifying said type specifies between an inclusive and an exclusive type, and
two or more additional bits each identifying an individual characteristic of said first set of RFID tag characteristics,
wherein identification of said inclusive type and said exclusive type is used to specify a corresponding inclusive and exclusive operation to be performed on the interrogation set of RFID tag characteristics of the interrogation command with corresponding first set of RFID tag characteristics to identify the RFID tag is selected when the two sets match.

18. The RFID tag of claim 17 wherein the interrogation command is configured to activate RFID tags that meet only one of the RFID tag characteristics within the interrogation set of RFID tag characteristics when the bit in the interrogation command defines as inclusive type, and wherein the interrogation command is configured to activate RFID tags that meet all of the indicated RFID tag characteristics within the interrogation set of RFID tag characteristics when the bit in the interrogation command defines as exclusive type.

19. The RFID tag of claim 18 wherein the interrogation set of RFID tag characteristics embedded in the interrogation command comprise:
  at least one characteristic related to tag security;
  a tag class identifier,
  wherein the diverse set of RFID tag characteristics comprise:
  a security characteristics, and
  at least one characteristics related to at least one of a tag alarm status, a tag class, sensor type, and a tag memory, and
  wherein the interrogation command is configured to cause less than all of the activated RFID tags to respond based on whether the at least one of identifying the type of tag interrogation to be performed and identifying the type of tag activation to be performed is said inclusive or exclusive type and which of the activated RFID tags has the RFID tag characteristic or characteristics indicated in the interrogation command.

20. The RFID tag of claim 17 wherein the RFID tag characteristics embedded in the interrogation command comprise at least one characteristic related to a sensor type.

21. The RFID tag of claim 17 wherein the RFID tag characteristics embedded in the interrogation command comprise at least one characteristic related to a tag memory.

22. The RFID tag of claim 17 wherein the RFID tag characteristics embedded in the interrogation command comprise at least one characteristic related to at least one of a tag alarm, a tag security, and a tag class.

23. A method for activating a first set of RFID tags within a plurality of RFID tags having a diverse set of RFID tag characteristics, the method comprising:
  creating a single activation command that identifies a first set of RFID tag characteristics corresponding to the first set of RFID tags to be selected within the diverse set of RFID tag characteristics corresponding to the plurality of RFID tags, the first set of RFID tag characteristics includes more than one characteristics;
  inserting bits within the activation command; the bits comprising:
    at least one bit for identifying a type of tag activation to be performed, wherein identifying said type specifies an inclusive and an exclusive type, and
    two or more additional bits each identifying an individual characteristic of said first set of RFID tag characteristics,
  wherein identification of said inclusive type and said exclusive type is used to specify a corresponding inclusive and exclusive operation to be performed in the plurality of RFID tags on the first set of RFID tag characteristics of the activation command with corresponding tag characteristics of said plurality of RFID tags to identify said first set of RFID tags to be selected;
  transmitting the activation command to the plurality of RFID tags; and
  activating said first set of RFID tags based at least in part on the first set of RFID tag characteristics and the type of tag activation and a corresponding inclusive or exclusive operation being performed,
  wherein the activation command is configured to activate RFID tags that meet at least one of the RFID tag characteristics within the first set of RFID tag characteristics when the at least one bit defines as the inclusive type, and
  wherein the activation command is configured to activate RFID tags that meet all of the indicated RFID tag characteristics within the first set of RFID tag characteristics when the at least one bit defines as the exclusive type.

24. The method of claim 23 wherein the type of tag activation is the exclusive type where the RFID tag must have all RFID tag characteristics in the first set of RFID tag characteristics to be selected,
  wherein the first set of RFID tag characteristics identified in the activation command includes a tag class identifier, and
  wherein the diverse set of RFID tag characteristics comprises a security characteristic, and at least one characteristic related to at least one of a tag alarm status, a tag class, a sensor type, and a tag memory.

25. The method of claim 23 wherein the type of tag activation is the inclusive type where the RFID tag must have at least one RFID tag characteristic within the first set of RFID tag characteristics to be selected.

26. The method of claim 24 wherein the first set of RFID tag characteristics comprises a tag class identifier, wherein the tag class identifier is selected from a group consisting of a class 3 identifier and a class 3 plus identifier.

27. The method of claim 23 further comprising:
  inserting a bit or bits within a query command that identifies a type of tag interrogation to be performed on the first set of RFID tags based on a second set of RFID tag characteristics; wherein the type of tag interrogation specifies an inclusive or exclusive type and identification of said inclusive and said exclusive type is used to specify a corresponding inclusive and exclusive operation to be performed on the first set of RFID tag characteristics of the activation command with corresponding tag characteristics of the first set of RFID tags to identify said second set of RFID tags to be selected;
  transmitting the query command to the activated first set of RFID tags;
  selecting a second set of RFID tags from the activated first set of RFID tags based at least in part on the second set of RFID tag characteristics and the type of tag interrogation; and
  interrogating the second set of RFID tags.

28. The method of claim 23 wherein the second set of REID tag characteristics is different than the first set of RFID tag characteristics.

29. The method of claim 23 wherein the first set of RFID tag characteristics comprises a memory characteristic.

30. The method of claim 23 wherein the first set of RFID tag characteristics comprises at least one of an alarm characteristic, a security characteristic, a sensor characteristic, and a tag class identifier.

* * * * *